UNITED STATES PATENT OFFICE.

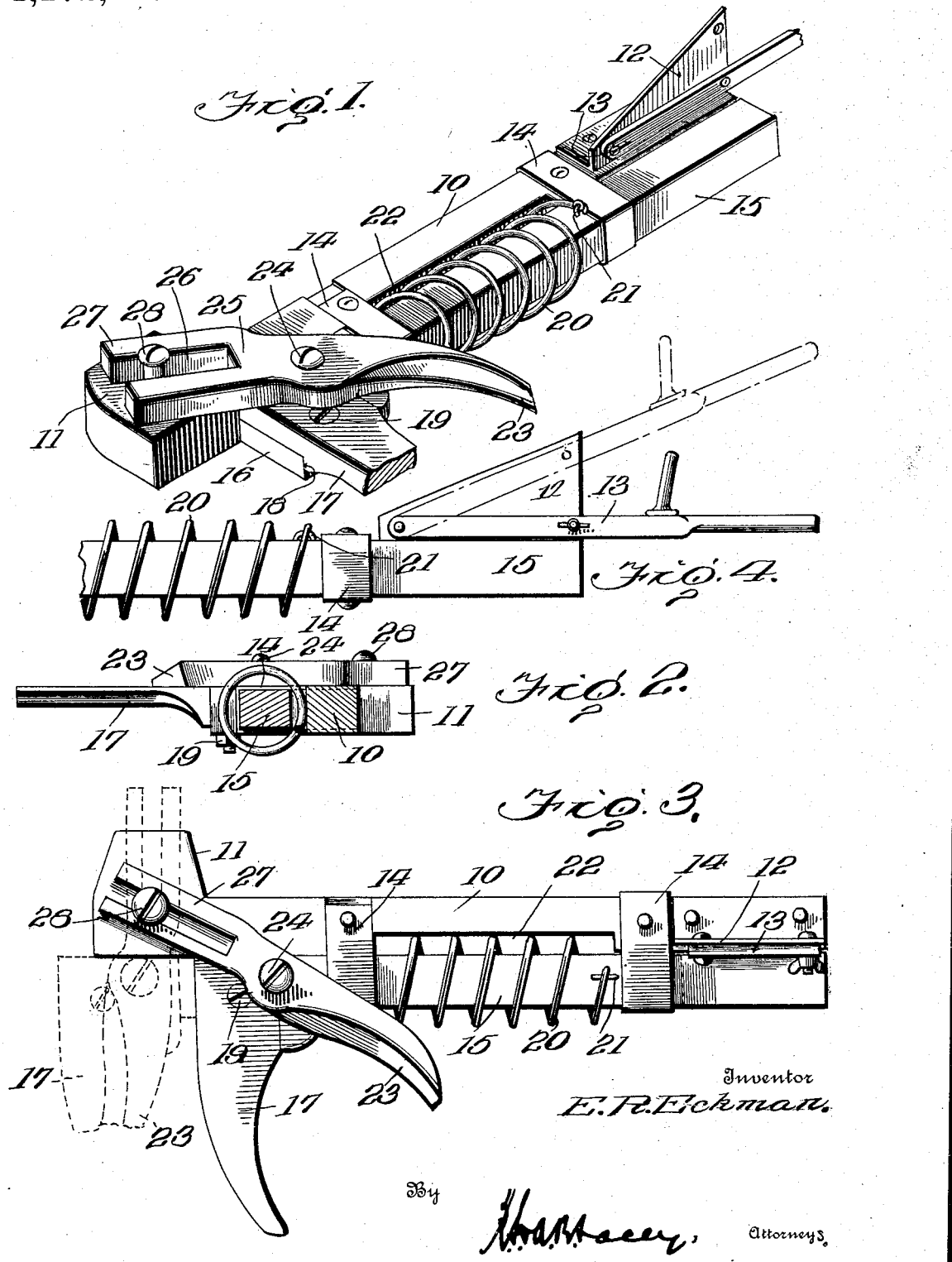

ELDER R. ECKMAN, OF COUNCIL GROVE, KANSAS.

COMBINED WEED KNIFE AND PULLER.

1,172,687.     Specification of Letters Patent.     Patented Feb. 22, 1916.

Application filed June 14, 1915. Serial No. 33,964.

*To all whom it may concern:*

Be it known that I, ELDER R. ECKMAN, a citizen of the United States, residing at Council Grove, in the county of Morris and State of Kansas, have invented certain new and useful Improvements in Combined Weed Knives and Pullers, of which the following is a specification.

This invention contemplates an improved weed cutter or puller and has as its primary object to provide a device of this character which may be readily carried in one hand of the operator when riding upon a cultivator, in working corn or the like, and which may be easily manipulated to cut or pull weeds growing so closely to the rows of corn, that the cultivator cannot reach them.

The invention has as a further object and of equal importance with the foregoing to provide a device of this character which may also be used as a pruning implement.

A still further object of the invention is to provide a construction wherein the coacting blades of the device will be demountable so that they may be readily sharpened, and wherein one of said blades will be adjustable either toward or away from the other blade to the end that the blades may be caused to coact and produce an effectual shearing cut, or may be caused to merely grip the weeds between them so that the weeds may be readily pulled. And the invention has as a still further object to provide an arrangement wherein the blades will be yieldably returned to normal position after having been actuated.

Other and incidental objects will appear as the description proceeds and in the drawings wherein I have illustrated the preferred embodiment of my invention and wherein similar reference characters designate corresponding parts throughout the several views, Figure 1 is a perspective view of my improved device, Fig. 2 is a sectional view particularly showing the disposition of the coacting cutting blades, Fig. 3 is a plan view showing, in dotted lines, the position of the blades when moved into coacting relation, and Fig. 4 is a fragmentary side elevation showing the mounting of the handle employed and the manner in which it may be adjusted relative to the stock of the device.

In the preferred embodiment of my invention, as illustrated in the drawing, I employ a stock or body portion 10 which at one extremity, is provided with a laterally extending foot or extension 11 having flat side faces. The stock 10 may be formed of any suitable material and may, of course, be constructed any desired length. Secured to one side of the stock at its extremity opposite the foot 11 is a plate 12 which is preferably formed from a piece of sheet metal having one longitudinal margin thereof bent at substantially right angles to seat against the adjacent face of the stock to which it is secured in any suitable manner. Pivotally connected at one end to the upstanding portion of the plate 12, is a handle 13 which is adjustable upon the plate in the manner indicated by dotted lines in Fig. 4 of the drawings to lie parallel to the stock 10 or to extend in angular relation thereto, this adjustment of the handle being found convenient to facilitate the manipulation of the device. Connected to the intermediate portion of the stock 10 at longitudinally spaced points are laterally projecting loops or guides 14. Each of the guides 14 is preferably formed from a strip of suitable sheet metal bent to embrace the stock 10 to which it is suitably connected. Freely mounted in the guides 14 to abut the adjacent longitudinal edge of the stock 10 is an operating lever 15 which, as best shown in Fig. 1 of the drawings, is preferably shorter than the stock. The operating lever 15 is provided with a terminal head 16 which is cut away upon one side to provide a seat for a blade or jaw 17 mounted upon the head and extending laterally therefrom. The jaw 17 is preferably longitudinally curved and at its inner extremity is also cut away to engage within the seat formed on the head 16 and to define a transversely extending shoulder 18 engaging against the adjacent edge of the head. Detachably connecting the blade 17 with the head, is a bolt or screw 19.

Surrounding the operating lever 15 and disposed between the guides 14 is a helical spring 20, one extremity of which engages the lowermost guide 14 or the guide arranged adjacent the foot 11, while the opposite extremity of said spring is connected to the operating lever 15 in any suitable manner as by a staple 21. It will be observed that the spring 20 is thus adapted to normally maintain the operating lever 15 and the jaw 17 in the position shown in Fig. 1 of the drawings, the head 16 of the operating lever being adapted to engage the adjacent guide 14 for limiting the operating lever in its movement to normal position under the tension of said spring. The stock 10 is cut away upon the adjacent edge thereof as shown at 22 to receive the spring, and by this arrangement, it will be observed that the operating lever 15 is mounted for free sliding movement longitudinally of the stock 10. Mounted upon the head 16 of the operating lever 15, to confront the blade 17 is a coacting blade or jaw 23, which is preferably longitudinally curved in a reverse direction to the curvature of the blade 17. The blade 23 is detachably and adjustably connected with the head 16 by a pivot pin 24 which may be in the nature of an ordinary screw. The blade 23, at its inner end, is provided with a notched longitudinal extension 25 which is longitudinally slotted as at 26 to define spaced arms 27 confronting the foot 11 of the stock 10. Mounted upon the foot 11 and freely received within the slot 26, is a laterally extending pivot pin 28 which also, as in the case of the pivot pin 24, may be in the nature of a screw.

It will be observed that in the normal position of the jaws 17 and 23, the coacting extremities thereof will be supported in spaced relation as shown in Figs. 1 and 3 of the drawings. In use, the stock 10 is manipulated by one hand of the operator through the medium of the handle 12 to cause the jaws to embrace the weeds. The operating lever 15 is then pushed downwardly with the other hand against the tension of the spring 20. Such movement of the operating lever will cause the jaw 23 to be moved upon its pivot through the medium of the pivot pin 28 slidably engaging within the slot 26, the jaws tending to assume the position shown in dotted lines in Fig. 3 of the drawings. Upon the release of the operating lever 15, the spring 20 will again return the jaws to normal position.

It will therefore be seen that the device may be readily manipulated and may be easily carried in one hand and operated to cut or pull weeds growing so closely to a row of corn that a cultivator could not reach them. In this connection, attention is directed to the fact that the blade 23 may be adjusted either toward or away from the blade 17 by tightening or loosening the pivot pin 24, and thus, the blades may be caused to produce a sharp shearing cut so as to readily sever the weeds, or may be adjusted to freely grip the weeds between them so that the weeds may be pulled.

While I have described the invention as being particularly adapted for use in cutting and pulling weeds, still, it will be seen that it will also provide an efficient pruning implement particularly adapted for use in trimming trees or shrubbery.

Having thus described my invention, what I claim and desire to secure by Letters Patent is:—

1. A device of the character described including a stock, an operating lever shiftable upon the stock, coacting blades carried by the operating lever, and means carried by the stock and freely engaging one of said blades, for causing a shifting of one blade relative to the other upon a movement of the lever.

2. A device of the character described including a stock, an operating lever shiftably mounted thereon, a fixed blade carried by the operating lever, a pivoted blade carried by said lever and adapted to coact with the fixed blade, and means carried by the stock and adapted to slidably engage said last mentioned blade, for causing a shifting of one blade relative to the other upon the movement of the lever.

3. A device of the character described including a stock, an operating lever shiftably mounted thereon, a fixed blade carried by said lever, a pivoted blade carried by the lever and adapted to coact with the fixed blade, and means carried by the stock and slidably received by said last mentioned blade for actuating the said blade upon the movement of the lever.

4. A device of the character described including a stock, an operating lever slidably mounted thereon, a fixed blade carried by the said lever, a pivoted blade carried by the lever and adapted to coact with the fixed blade, the said pivoted blade at one extremity being provided with an extension having a slot formed therein, and a pivot pin carried by the stock and freely engaging in said slot.

5. A device of the character described including a stock, an operating lever slidably mounted thereon, a fixed blade detachably connected to the said lever, a pivoted blade detachably connected to the lever and adjustable thereon toward or away from the fixed blade, the pivoted blade being adapted to coact with the fixed blade, and a pivot pin carried by the stock and freely engaging said pivoted blade.

6. A device of the character described including a stock, an operating lever slidably mounted thereon, a fixed blade carried by said lever, a pivoted blade carried by the lever and adapted to coact with the fixed blade, a pivot pin carried by the stock and freely engaging the pivoted blade, and yieldable means engaging said lever for normally urging the coacting ends of said blades away from each other.

7. A device of the character described including a stock, an operating lever slidably mounted thereon, coacting blades carried by said lever, one of said blades being pivotally mounted upon the lever and normally disposed with its coacting extremity spaced from the coacting extremity of the other blade, a pivot pin carried by the stock and freely engaging the pivoted blade, and yieldable means engaging the operating lever for urging the pivoted blade to normal position.

8. A device of the character described including a stock having a foot formed thereon, guides carried by the stock, an operating lever slidably mounted in said guides, a fixed blade carried by said lever, a pivoted blade carried by the lever and adapted to coact with the fixed blade, said pivoted blade having spaced arms formed thereon, a pivot pin carried by said foot and slidably engaging between said arms, and a spring engaging the operating lever for normally urging the said lever in one direction upon the stock.

9. A device of the character described including a stock having a foot formed thereon, longitudinally spaced guide loops carried by the stock, an operating lever freely mounted in said loops, said lever being provided with a head, a fixed blade carried by said head, a second blade pivotally mounted upon the head and adapted to coact with the fixed blade, the pivoted blade being provided with an extension confronting said foot and having a longitudinally extending slot formed therein, a pivot pin carried by the foot and freely engaging in said slot, and a spring surrounding the operating lever, the said spring at one extremity engaging one of said guides and at its opposite extremity, being connected to the lever, the said spring normally urging the lever in one direction upon the stock.

10. A device of the character described including a stock, an operating lever pivotally mounted thereon, coacting blades carried by the said lever, one of said blades being pivoted, and means carried by the stock and engaging the pivoted blade upon one side of its pivotal center for causing a shifting of one blade relative to the other upon the movement of the lever.

In testimony whereof I affix my signature in presence of two witnesses.

ELDER R. ECKMAN.

Witnesses:
M. E. LEATHERWOOD,
PEARL LEATHERWOOD.

Copies of this patent may be obtained for five cents each, by addressing the "Commissioner of Patents, Washington, D. C."